US011921397B2

(12) United States Patent
Muranaka et al.

(10) Patent No.: US 11,921,397 B2
(45) Date of Patent: Mar. 5, 2024

(54) OPTICAL SWITCH ELEMENT

(71) Applicant: Nippon Telegraph and Telephone Corporation, Tokyo (JP)

(72) Inventors: Yusuke Muranaka, Musashino (JP); Toshikazu Hashimoto, Musashino (JP); Tatsushi Nakahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 379 days.

(21) Appl. No.: 17/294,991

(22) PCT Filed: Dec. 11, 2019

(86) PCT No.: PCT/JP2019/048459
§ 371 (c)(1),
(2) Date: May 18, 2021

(87) PCT Pub. No.: WO2020/129768
PCT Pub. Date: Jun. 25, 2020

(65) Prior Publication Data
US 2022/0091472 A1 Mar. 24, 2022

(30) Foreign Application Priority Data
Dec. 20, 2018 (JP) .................... 2018-238002

(51) Int. Cl.
*G02F 1/225* (2006.01)
*G02F 1/21* (2006.01)
(52) U.S. Cl.
CPC .............. *G02F 1/225* (2013.01); *G02F 1/212* (2021.01)
(58) Field of Classification Search
CPC ................. G02F 1/225; G02F 1/212
(Continued)

(56) References Cited

U.S. PATENT DOCUMENTS 4,852,958 A  8/1989  Okuyama et al.
6,597,830 B1  7/2003  Nakabayashi et al.
(Continued)

FOREIGN PATENT DOCUMENTS

JP    H06-59294 A    3/1994
JP    S63-234228 A   9/1998
(Continued)

OTHER PUBLICATIONS

Toshio Watanabe et al., *Silica-based PLC 1 x 128 Thermo-Optic Switch*, Proceedings 27th European Conference on Optical Communication (ECOC), Sep. 30, 2001, pp. 134-135.
(Continued)

*Primary Examiner* — Jerry M Blevins
(74) *Attorney, Agent, or Firm* — Workman Nydegger

(57) ABSTRACT

Provided is an optical switch element capable of adjusting an output strength of light output from an optical switch to a fixed level. The optical switch element includes: an optical coupler configured to divide an input light into N fractions of light and output the N fractions of light, where N represents an integer equal to or larger than 2; N branch optical waveguides connected to an output side of the optical coupler; N light absorption gates connected to the respective N branch optical waveguides; and N output optical waveguides connected to the respective N light absorption gates, the optical coupler, the N branch optical waveguides, the N light absorption gates, and the N output optical waveguides being connected to one another in order, the N light absorption gates each being controlled to adjust an output strength of transmitted light output from the N output optical waveguides based on a loss amount acquired in advance by a light absorption effect or light amplification effect of the N light absorption gates.

6 Claims, 10 Drawing Sheets

(58) Field of Classification Search
USPC ............................................................ 385/3
See application file for complete search history.

(56) References Cited

U.S. PATENT DOCUMENTS

| | | |
|---|---|---|
| 2004/0086220 A1 | 5/2004 | Mino et al. |
| 2005/0100260 A1* | 5/2005 | Yamazaki ............... G02F 1/225 |
| | | 385/5 |
| 2006/0062516 A1* | 3/2006 | Maigne .............. H04Q 11/0005 |
| | | 385/24 |
| 2008/0074722 A1* | 3/2008 | Kang ...................... G02F 1/025 |
| | | 359/240 |
| 2010/0111464 A1* | 5/2010 | Kissa ................... G02F 1/2255 |
| | | 385/2 |

FOREIGN PATENT DOCUMENTS

| | | |
|---|---|---|
| JP | 2000-19569 A | 1/2000 |
| JP | 2004-177515 A | 6/2004 |
| JP | 2015-60044 A | 3/2015 |

OTHER PUBLICATIONS

T. Segawa et al., *An 8×8 Broadcast-and-Select Optical Switch Based on Monolithically Integrated EAM-Gate Array*, 39th European Conference and Exhibition on Optical Communication (ECOC 2013) We.4.B.1., Sep. 22, 2013.

* cited by examiner

OPTICAL SWITCH ELEMENT

TECHNICAL FIELD

The present invention relates to an optical switch element, which is an important optical part for supporting a large-capacity optical communication network.

BACKGROUND ART

In recent years, communication traffic has been drastically increasing due to development of various kinds of network services, and phase modulation and multi-level modulation that increase a transmission capacity or have high band use efficiency through use of a wavelength multiplexing technology have been studied, with the result that a wide variety of sophisticated large-capacity optical communication are transferred on an optical communication network.

The optical communication network is formed of a plurality of links and nodes, and research and development of each of the links and nodes are conducted to achieve high-speed and large-capacity communication. High-speed transfer of signals, multiplexing of wavelengths, or other technologies are developed for the links, whereas a technology of flexibly changing a path connecting between nodes to achieve efficient communication traffic is considered to be important for the nodes. For example, a technology of temporality converting transmitted optical signals into electric signals at an input end of a node, switching the electric signals, converting the electric signals into optical signals again at an output end of the node, and transmitting the optical signals is known. In this case, conversion of optical signals into electric signals and high-speed switching of the electric signals consume a large amount of electric power.

Meanwhile, research and development of a technology of arranging optical switches in a node, and switching optical signals without converting the optical signals into electric signals are also conducted. In this case, the optical switch switches optical signals as they are and changes the path, and thus conversion of optical signals into electric signals and high-speed switching of the electric signals are not required, which enable high-speed switching of optical signals with low latency and low power consumption.

As such an optical switch, research and development of, for example, a thermo-optic (TO) switch constructed on a planar lightwave circuit (PLC), a switch that uses an InP electroabsorption modulator (EAM), Mach-Zehnder interferometer (MZI), or semiconductor optical amplifier (SOA), and an $LiNbO_3$ phase-modulator switch are conducted.

For example, NPL 1 proposes an example of constructing an optical switch on a PLC.

As shown in NPL 1, for example, a configuration of connecting N 1×N optical switches and N N×1 optical switches is conceivable as a main configuration of an N×N optical switch (N represents a positive integer).

A related-art N×N optical switch 70 is illustrated in FIG. 9 as an example. As illustrated in FIG. 9, the related-art N×N optical switch 70 includes N 1×N optical switches 71 on an input side and N N×1 optical switches 72 on an output side.

The related-art N×N optical switch 70 uses the 1×N optical switch 71 on the input side to output an optical packet input via an input port to the N×1 optical switch 72 on the output side, which is connected to a desired output port. With this, it is possible to implement a non-blocking N×N optical switch that can achieve any connection independently of connection states of other ports.

As a related art for constructing the 1×N optical switch 71 on the input side, a 2×2 optical switch element is proposed in Patent Literature 1, for example. FIG. 10 is a diagram illustrating an oblique view of a related-art 2×2 optical switch element. The 2×2 optical switch element in FIG. 10 is a directional-coupler optical switch element, and has a configuration in which an optical input unit I, an optical input unit II, an optical output unit III, and an optical absorption unit IV are provided on an n-InP board 6.

More specifically, the related-art 2×2 optical switch element illustrated in FIG. 10 has structure in which an i-MQW layer 5, an i-InP clad layer 4, and a p-InP clad layer 3 are stacked in order on the n-InP board 6. As illustrated in FIG. 10, the p-InP clad layer 3 is formed to be a thin line. Further, a $p^+$-InGaAs cap layer 2 and a p-type electrode 1 are formed in order on one p-InP clad layer 3 of the optical input unit II and both p-InP clad layers 3 of the optical absorption unit IV. An n-type electrode 7 is formed on the back surface of the n-InP board 6. The reference symbols A and B in FIG. 10 represent input ports, and the reference symbols C and D of FIG. 10 represent output ports.

The wave of an input signal light such as an optical packet is guided to a portion located below the p-InP clad layer 3 formed to be a thin line inside the i-MQW layer 5. The i-MQW layers 5 located below the p-InP clad layers 3 of the optical input unit I, the optical input unit II, the optical input unit III, and the optical absorption unit IV are hereinafter referred to an input optical waveguide, an optical switch waveguide, an output optical waveguide, and a light absorption waveguide, respectively.

An input signal light is input to any one input optical waveguide, and is guided to the optical switch waveguide. On the optical switch waveguide, a desired voltage is applied between the p-type electrode 1 and the n-type electrode 7 provided in the optical input unit II to change a refractive index of the optical switch waveguide below the p-type electrode 1 by a quantum confined stark effect (QCSE) due to, for example, multiple quantum well (MQW) structure, to thereby output a signal light from only one optical switch waveguide. In other words, the optical path is switched. On the optical absorption unit IV, a desired electric field is applied between the p-type electrode 1 and the n-type electrode 7 provided in a light absorption waveguide different from the light absorption waveguide to which a signal light has been input. As a result, a crosstalk light that has leaked from the optical switch waveguide is absorbed by the light absorption waveguide, whereas a signal light output from the optical switch waveguide is guided to the output optical waveguide. In this manner, in Patent Literature 1, the optical absorption unit IV is included to implement an optical switch element capable of reducing an influence of light that has leaked from the optical switch waveguide.

CITATION LIST

Patent Literature

[PTL 1] Japanese Patent Application Laid-open No. H06-59294

Non Patent Literature

[NPL 1] T. Watanabe et al. "Silica-based PLC 1×128 Thermo-OpticSwitch", 27th European Conference on Optical Communication (ECOC), 2001, Vol. 2, pp. 134-135

SUMMARY OF THE INVENTION

Technical Problem

When an optical switch is employed in a node, an operation of transferring optical signals flowing through a link without converting the optical signals into electric signals is conceivable. At this time, light loss occurs on a path to an output port of an optical switch device in most cases although this depends on the mode or number of ports of the device. The node uses an amplification device as represented by, for example, an erubium doped fiber amplifier (EDFA) or a semiconductor optical amplifier (SOA) in order to compensate for the light loss that has occurred in the device after switching.

As examples of the configuration of an N×N optical switch, various kinds of modes of the N×N optical switch such as a Benes switch, a crossbar switch, and a banyan switch described in PTL 1 are implemented in addition to the spank switch illustrated in FIG. 9. In an N×N optical switch, a difference in loss amount between output ports occurs not only when the number of times of passage of a switching element to be passed through is different depending on an output port to be switched or when the length of a waveguide to be passed through is different, but also depending on a production error or the state of a wafer, which causes a deviation in output strength of light output from the optical switch. As described above, in an optical switch employed in a node, constant light amplification is desired to be applied after passage of the optical switch by using an amplification device. However, there is a problem in that, when there is a difference in loss between output ports, the deviation in output strength of light output from the optical switch cannot be removed by amplification with a fixed gain.

The present invention has been made in view of the above-mentioned problem, and has an object to provide an optical switch element capable of adjusting an output strength of light output from an optical switch to a fixed level.

Means for Solving the Problem

According to a first invention for solving the above-mentioned problem, there is provided an optical switch element, including: an optical coupler configured to divide an input light into N fractions of light and output the N fractions of light, where N represents an integer equal to or larger than 2; N branch optical waveguides connected to an output side of the optical coupler; N light absorption gates connected to the respective N branch optical waveguides; and N output optical waveguides connected to the respective N light absorption gates, the optical coupler, the N branch optical waveguides, the N light absorption gates, and the N output optical waveguides being connected to one another in order, the N light absorption gates each being controlled to adjust an output strength of transmitted light output from the N output optical waveguides based on a loss amount acquired in advance by a light absorption effect or light amplification effect of the N light absorption gates.

According to a second invention for solving the above-mentioned problem, there is provided an optical switch element according to the first invention, further including, in place of the optical coupler, a structure of dividing the input light into N fractions of light and outputting the N fractions of light by using an interference effect due to an MZI, where N represents an integer equal to or larger than 2.

According to a third invention for solving the above-mentioned problem, there is provided an optical switch element according to the first or second invention, in which the N output optical waveguides form a light circuit and have different loss amounts, and in which the N light absorption gates are each controlled to adjust the output strength of transmitted light output from the N output optical waveguides based on the loss amounts different for the respective N output optical waveguides by the light absorption effect or light amplification effect of the N light absorption gates.

According to a fourth invention for solving the above-mentioned problem, there is provided an optical switch element according to the third invention, further including a loss medium configured to increase loss amounts of a part of the N output optical waveguides, which are smaller than loss amounts of the N output optical waveguides, among the N output optical waveguides.

According to a fifth invention for solving the above-mentioned problem, there is provided an optical switch element according to the fourth invention, in which the loss medium includes a pseudo intersection that artificially causes a loss due to a waveguide intersection.

According to a sixth invention for solving the above-mentioned problem, there is provided an optical switch element according to any one of the first to fifth inventions, in which the N light absorption gates include an electroabsorption modulator.

According to a seventh invention for solving the above-mentioned problem, there is provided an optical switch according to any one of the first to fifth inventions, in which the N light absorption gates include a semiconductor optical amplifier.

Effects of the Invention

With the optical switch element according to the present invention, it is possible to adjust the output strength of light output from an optical switch to a fixed level.

DESCRIPTION OF EMBODIMENTS

Figure 1:
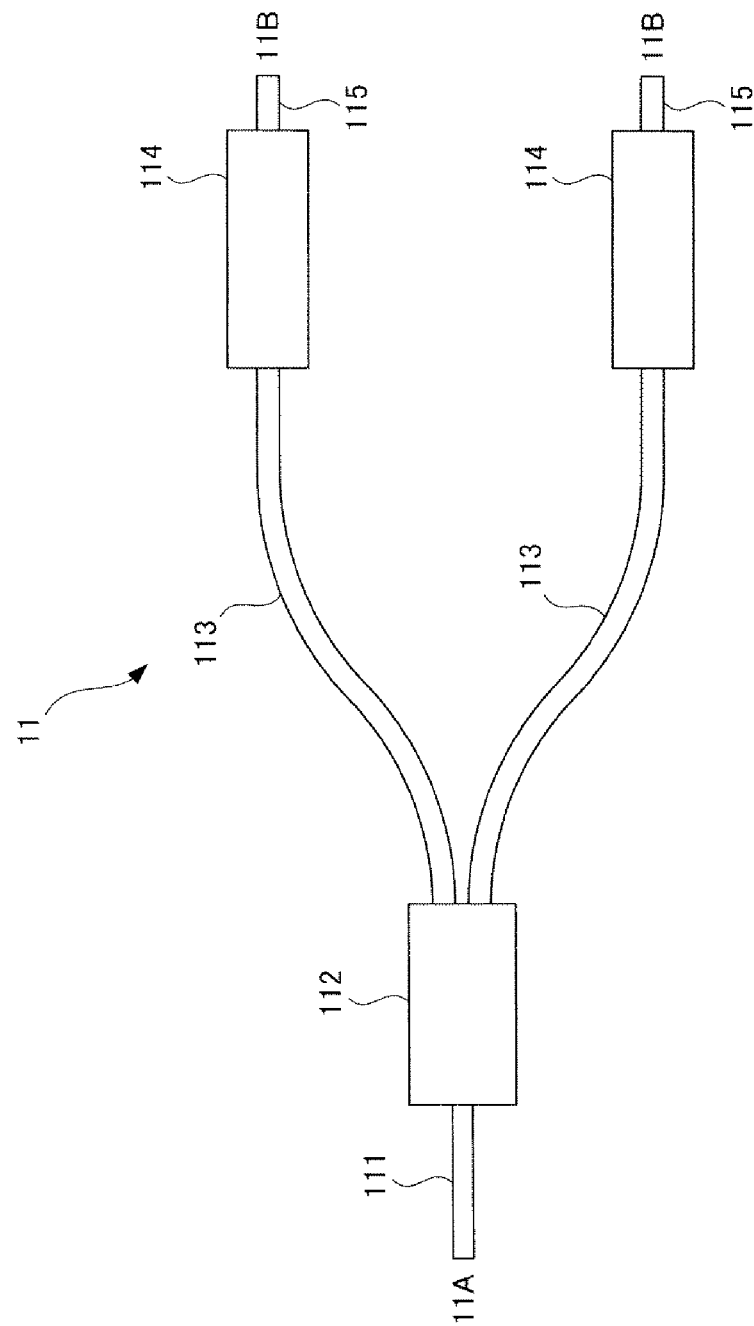
FIG. 1 is a configuration diagram illustrating a 1×2 broadcast-and-select optical switch according to an embodiment of the present invention.

As described below, an optical switch element according to the present invention includes an input optical waveguide, an optical coupler, a branch optical waveguide, a light absorption gate, and an output optical waveguide, which are connected in order. The optical coupler is connected to the input optical waveguide, and divides an input light into N fractions of light and outputs the N fractions of light. The reference numeral N represents an integer equal to or larger than two. N branch optical waveguides are connected to respective N outputs of the optical coupler on the output side. N light absorption gates are connected to respective outputs of the N branch optical waveguides. In the optical switch element according to the present invention, when transmitted light is output from the output optical waveguide, each of the N light absorption gates is controlled in the following manner. Specifically, the output strength of the transmitted light output from the output optical waveguide is adjusted by a light absorption effect or light amplification effect of the light absorption gate based on a loss amount acquired in advance. More specifically, an electroabsorption modulator (EAM) or a semiconductor optical amplifier (SOA) is used as the light absorption gate, and the light absorption gate is controlled so that the light transmittance of the EAM/SOA, which is provided in association with a port that outputs light, is adjusted by an applied voltage/injected current, and the output strength of light output from each port is set to a fixed level in consideration of a difference in loss amount between ports.

With such a feature, the present invention exhibits an effect of achieving suppression of a deviation in output strength of light output from the optical switch element, and adjustment of the output strength to a fixed level.

Now, a description is given of an optical switch element according to an embodiment of the present invention with reference to the drawings. In this embodiment, a broadcast-and-select optical switch (optical switch element) 11 illustrated in FIG. 1 is adopted as a switching mechanism of a 1×N optical switch.

As illustrated in FIG. 1, the broadcast-and-select optical switch 11 has one input port 11A and two output ports 11B, and includes an input optical waveguide 111, a 1×2 optical coupler 112 connected to the input optical waveguide 111 and configured to divide an input light into two fractions of light, two branch optical waveguides 113 connected to the output side of the 1×2 optical coupler 112, two light absorption gates 114 connected to the respective two branch optical waveguides 113, and two output optical waveguides 115 connected to the respective two light absorption gates 114. A multi-mode interference (MMI) optical coupler is used as the 1×2 optical coupler 112, and an EAM is used as the light absorption gate 114. An SOA can also be adopted as the light absorption gate 114 instead of the EAM.

Figure 2:
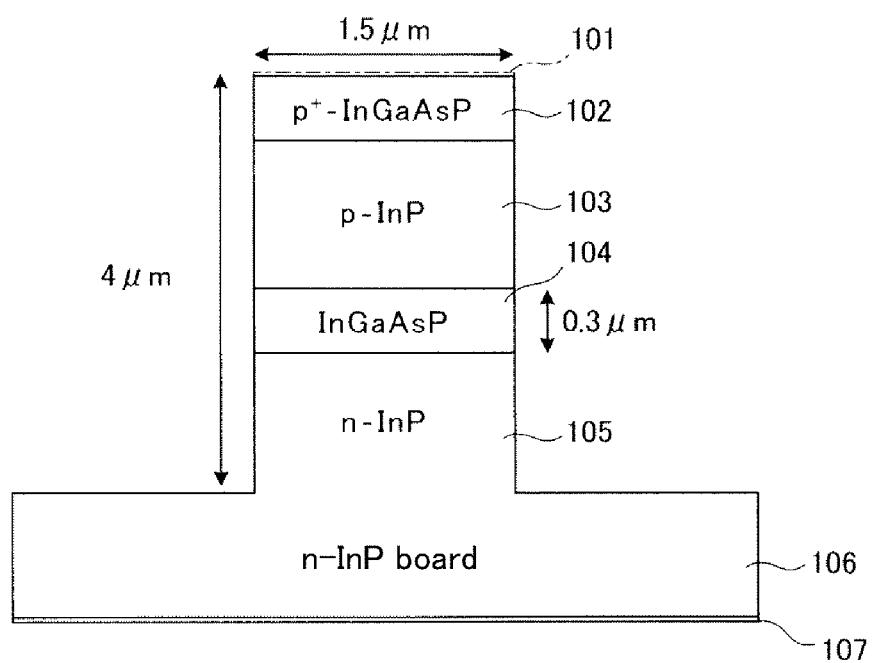
FIG. 2 is a cross-sectional view illustrating optical waveguide structure of the broadcast-and-select optical switch according to an embodiment of the present invention.

The broadcast-and-select optical switch 11 has optical waveguide structure as illustrated in FIG. 2 described later in detail.

In the light absorption gate 114, as described next, an n-type electrode 107 provided on an n-InP board 106 described later is connected to the ground (electric potential=0 V), and when a negative voltage is applied to a p-type electrode 101 provided on the light absorption gate 114, an absorption coefficient at the wavelength of a signal light propagating through the light absorption gate 114 increases. This is because an absorption end at an InGaAsP core layer 104 shifts due to a Franz-Keldysh (FK) effect.

In this manner, through control of the voltage applied to the light absorption gate 114, it is possible to perform switching of absorbing light of one output port 11B, which is not required to output light, by one light absorption gate 114, and outputting light only from the other output port 11B.

Figure 3:
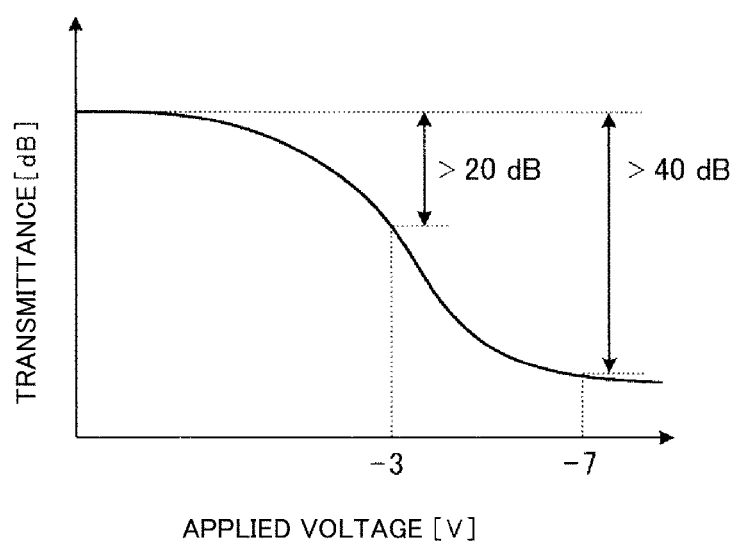
FIG. 3 is a graph showing a relationship between an extinction ratio and an applied voltage in a light absorption gate of the broadcast-and-select optical switch according to an embodiment of the present invention.

In the light absorption gate 114 of the broadcast-and-select optical switch 11, as shown in FIG. 3, it is possible to obtain 20 dB or more of the extinction ratio at the applied voltage of −3 V and 40 dB or more of the extinction ratio at the applied voltage of −7 V.

With such a broadcast-and-select optical switch 11, it is possible to achieve 1×N switching by increasing the number of branches in addition to 1×2 switching.

Figure 4:
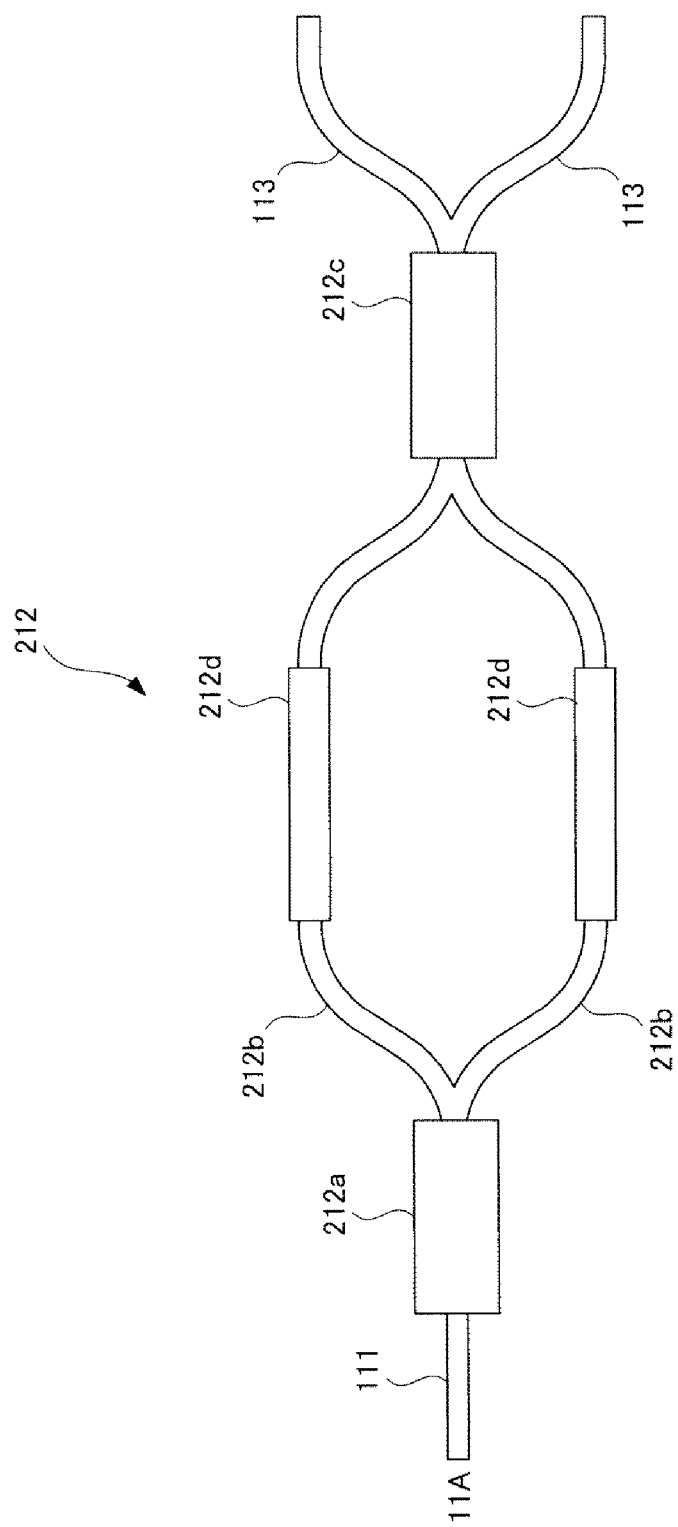
FIG. 4 is a configuration diagram illustrating an example of an MZI optical switch.

Further, instead of the 1×2 optical coupler 112 described above, a switching mechanism (hereinafter referred to as "MZI optical switch") that uses an interference effect due to MZI as illustrated in FIG. 4 may be adopted.

In FIG. 4, components exhibiting the same actions as those illustrated in FIG. 2 are assigned with the same reference symbols.

In the MZI optical switch 212 illustrated in FIG. 4, the 1×2 optical coupler 212a divides an input light into two fractions of light, and after the divided two input fractions of light have a difference in phase between two optical waveguides 212b, those fractions of light are combined by a 2×2 optical coupler 212c. Then, due to an interference effect, when the difference in phase between two optical waveguides 212b is ±nπ (n is an integer), light is output from one of the two branch optical waveguides 113, whereas when the difference is ±(2+1)π/2, light is output from the other of the two branch optical waveguides 113. Thus, a 2×2 switching operation is obtained by providing a phase modulation region in one optical waveguide 212b and controlling the phase. In the example illustrated in FIG. 4, MMI optical couplers are used as the 1×2 optical coupler 212a and the 2×2 optical coupler 212c.

The refractive index of one optical waveguide 212b may be changed to perform phase modulation. For example, in an InP optical waveguide, a switching operation can be performed by changing the refractive index of the optical waveguide 212b using an FK effect or quantum confined stark effect through application of a voltage to a control electrode 212d provided on one optical waveguide 212b or using a plasma effect through injection of a current to the control electrode 212d. For example, in an LN optical waveguide, a switching operation can be performed by changing the refractive index of the optical waveguide 212b using a Pockels effect through application of a voltage to the control electrode 212d. Further, for example, a directional coupler may be used as the MMI optical coupler configured to divide the light strength into two equal strengths.

With such an MZI optical switch 212, it is possible to achieve 1×N switching by setting a plurality of stages of MZIs in tree structure in addition to one stage of MZI.

Next, a description is given of a method of producing the optical switch device illustrated in FIG. 1.

As illustrated in FIG. 2, an n-InP lower clad layer 105, an i-InGaAsP bulk core layer 104 with the film thickness of 0.3 µm of 1.4Q composition, a p-InP upper clad layer 103, and a p+-InGaAs cap layer 102 are grown on the n-InP board 106 by a metal organic vapor phase epitaxy (MOVPE) method. Next, the input optical waveguide 111 having deep ridge waveguide structure, the 1×2 optical coupler 112, the branch optical waveguide 113, the light absorption gate 114, and the output optical waveguide 115 are formed at the same time by photolithography and dry etching. After the optical waveguide structure is formed, Benzocyclobutene (BCB), which is an organic material that can be embedded into a local region and is superior in flattening, is coated by spin-coating, and is etched back until the board surface is exposed by reactive ion etching (RIE) using $O_2/C_2F_6$ mixed gas, to thereby flatten the board surface. Lastly, the p-type electrode 101 is formed on the p+-InGaAs cap layers 102 of the light absorption gate 114 and the 1×2 optical coupler 111, and the n-type electrode 107 is formed on the back surface of the n-InP board 106 or a region of the board 106 in which the optical waveguide structure is not formed. As described above, the MOVPE growing process and the optical waveguide structure forming process are performed at the same time. Further, contrary to the related-art optical switch element, the process of removing the n-InP lower clad layer 105 and the p+-InGaAs cap layer 102 between the 1×2 optical coupler 112 and the light absorption gate 114 is not required. Thus, it is possible to provide, with a simple production method, an optical switch element having extremely low light crosstalk without degrading the optical property. The same holds true also when the MZI optical switch 212 illustrated in FIG. 4 is employed instead of the 1×2 optical coupler 112.

In this embodiment, the i-InGaAsP bulk core layer 104 with the film thickness of 0.3 μm and width of 1.5 μm of 1.4Q composition is used. Those design values are parameters important for determining the optical property of the broadcast-and-select optical switch 11.

The following conditions are preferred to be satisfied so that the broadcast-and-select optical switch operates at the input signal light wavelength of from 1.53 μm to 1.57 μm to achieve a low-loss and high-speed operation with low power consumption.

1) The thickness of the i-InGaAsP core layer 104 relates to a single-mode waveguide condition for an input signal light and a condition that sufficiently confines light to the i-InGaAsP core layer 104. The thickness of the i-InGaAsP core layer 104 is desired to fall within the range of from 0.1 μm to 0.4 μm.
2) The width of the i-InGaAsP core layer 104 relates to a single-mode waveguide condition for an input signal light, and is desired to fall within the range of from 0.8 μm to 3 μm.
3) The composition of the i-InGaAsP core layer 104 is 1.3Q to 1.5Q, and each electrode length is desired to fall within the range of from 100 μm to 2000 μm in the case of EAM, and is desired to fall within the range of from 50 μm to 1000 μm in the case of MZI.

The broadcast-and-select optical switch 11 according to this embodiment has been described based on the assumption that a bulk layer is used as the i-InGaAsP core layer 104 of the light absorption gate 114. However, the i-InGaAsP core layer 104 may have MQW structure. In that case, it is possible to achieve efficient extinction by a quantum confined stark effect. Further, the optical waveguide structure is set to be the deep ridge waveguide structure, but the optical waveguide structure may be produced as other structure such as ridge optical waveguide. Alternatively, the optical waveguide structure may be embedded optical waveguide structure in which semiconductors are embedded in both sides of the i-InGaAsP core layer 104, or rib optical waveguide structure.

In this embodiment, the description has been given by using an InP compound semiconductor, but a GaAs compound semiconductor may be used instead. Further, the present invention can be achieved similarly also by using materials whose refractive index and absorption coefficient can change on the order of nanoseconds, for example, a silicon thin line waveguide.

First Embodiment

Figure 5:
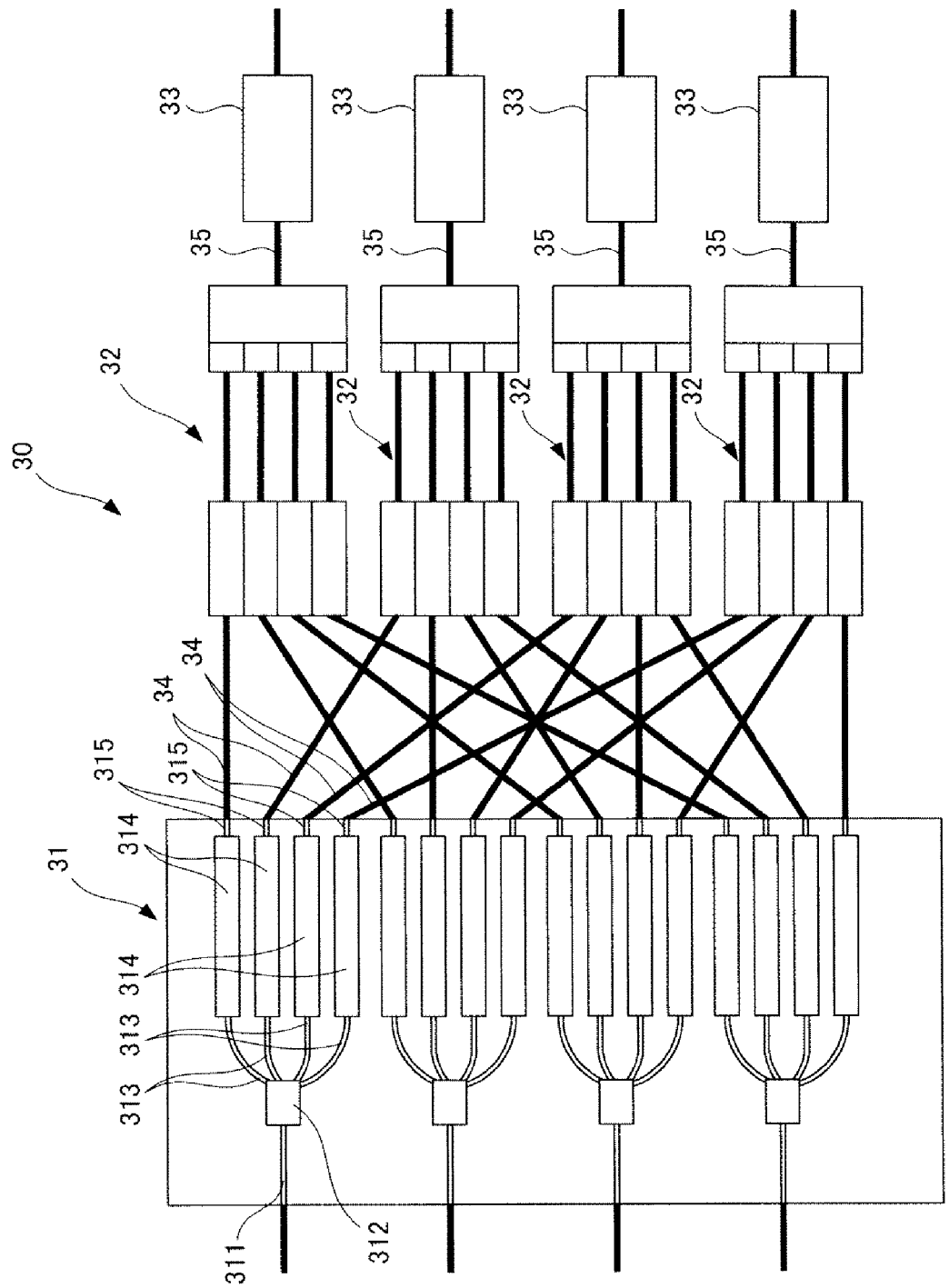
FIG. 5 is a configuration diagram illustrating a 4×4 broadcast-and-select optical switch according to a first embodiment of the present invention.

Now, a description is given of an optical switch element according to a first embodiment of the present invention with reference to FIG. 5.

As illustrated in FIG. 5, an optical switch 30 according to this embodiment is a 4×4 broadcast-and-select optical switch using a light absorption gate, and includes an optical switch device (optical switch element) 31, four 4×1 passive optical couplers 32, and four EDFAs (fiber amplifiers) 33.

The optical switch element 31 includes four input optical waveguides 311 provided on the same board, four 1×4 optical couplers 312 connected to the respective four input optical waveguides 311, a total of sixteen branch optical waveguides 313 connected to the respective four 1×4 optical couplers 312 on the output side in units of four waveguides, electroabsorption modulators (EAM) 314 serving as sixteen light absorption gates connected to the respective sixteen branch optical waveguides 313, and sixteen output optical waveguides 315 connected to the respective sixteen EAMs 314.

In this optical switch 30, each of four fractions of light input to the optical switch element 31 is divided into four fractions of light by the 1×4 optical coupler 312, and the sixteen fractions of light are input to the sixteen EAMs 314. The fractions of light output from the EAMs 314 are output from the optical switch element 31, and the four fractions of light obtained by dividing one light are input to different passive optical couplers 32 via optical fibers 34, respectively. The four passive optical couplers 32 each combine the four fractions of light into one light, resulting in four outputs. The light output from each passive optical coupler 32 is input to the EDFA 33 via an optical fiber 35, and is amplified to be output by the EDFA 33.

In this embodiment, the EAM 314 is used as the light absorption gate as described above, and it is possible to switch the port that outputs light by turning on/off of the voltage applied to the EAM 314, specifically, absorbing light by applying voltages to the EAMs 314 connected to output ports other than the output port (to output light) to be switched, and transmitting light without applying a voltage to the EAM 314 connected to the output port to be switched.

In the optical switch element 31, switching of the port that outputs light is achieved by the optical waveguide structure, and thus a difference in characteristic occurs for each port or chip due to a production error of the optical waveguide, for example. In particular, regarding loss, the optical waveguide element generally has an extreme difficulty in removing a difference in loss between output ports even when the waveguide length is designed to be equal, and a deviation in output strength of light output from the output optical waveguide 315 of the optical switch element 31 occurs. In view of this, in this embodiment, transmittance is set for each EAM 314 even when light is transmitted in consideration of the loss amount of each output port, and a minute voltage is applied to the EAM 314 connected to the output port to be switched based on the transmittance, to thereby adjust the transmittance. With this, it is possible to suppress the deviation in output strength in switching.

Specifically, the EAM 314 can perform effective extinction to block output by applying an inversely-biased high voltage, for example, −7 V, and can obtain a moderate loss increase effect by applying an inversely-biased small voltage when output of light is not blocked. On the basis of this fact, in this embodiment, for example, a loss amount on a path to each output port is grasped by measurement as a loss amount acquired in advance, and a voltage to be applied at the time of transmitting light is adjusted for each EAM 314 based on the loss amount for each path, to thereby perform control so that the output strength of light is set to a fixed level. That is, the loss amounts are measured in advance for all the output ports, and the amount of voltage to be applied at the time of transmitting light is set for each EAM 314.

With the configuration illustrated in FIG. 5, it is possible to equalize the output strength of light output from the optical switch 30 in addition to light output from the optical switch element 31 by considering, as loss amounts acquired in advance, not only a waveguide loss in the optical switch element 31 but also a deviation in loss between connectors such as the passive optical couplers 32 and the optical fibers 34 and 35 connecting those couplers.

Second Embodiment

Figure 6:
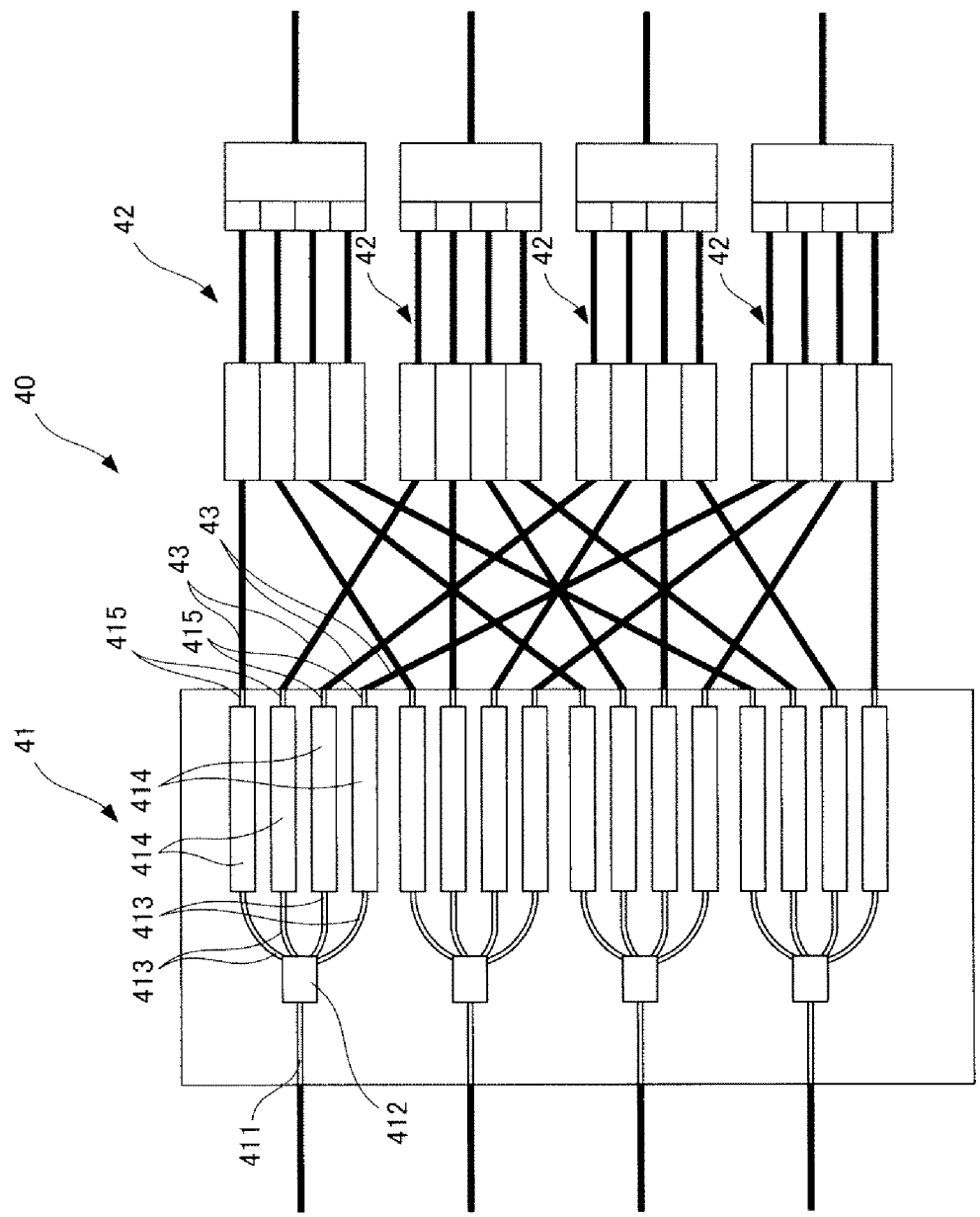
FIG. 6 is a configuration diagram illustrating a 4×4 broadcast-and-select optical switch according to a second embodiment of the present invention.

Now, a description is given of an optical switch element according to a second embodiment of the present invention with reference to FIG. 6.

As illustrated in FIG. 6, an optical switch 40 according to this embodiment is a 4×4 broadcast-and-select optical switch using a light absorption gate, and includes an optical switch device (optical switch element) 41 and four 4×1 passive optical couplers 42.

The optical switch element 41 includes four input optical waveguides 411 provided on the same board, four 1×4 optical couplers 412 connected to the respective four input optical waveguides 411, a total of sixteen branch optical waveguides 413 connected to the respective four 1×4 optical couplers 412 on the output side in units of four waveguides, semiconductor optical amplifiers (SOA) 414 serving as sixteen light absorption gates connected to the respective sixteen branch optical waveguides 413, and sixteen output optical waveguides 415 connected to the respective sixteen SOAs 414.

In this optical switch 40, each of four fractions of light input to the optical switch element 41 is divided into four fractions of light by the 1×4 optical coupler 412, and the sixteen fractions of light are input to the sixteen SOAs 414. The fractions of light output from the SOAs 414 are output from the optical switch element 41, and the four fractions of light obtained by dividing one light are input to different passive optical couplers 42 via optical fibers 43, respectively. The four passive optical couplers 42 each combine the four fractions of light into one light, resulting in four outputs.

In this embodiment, the SOA 414 is used as the light absorption gate as described above, and it is possible to suppress leakage light to other ports while at the same time increasing the output strength of light after switching depending on whether to inject current to the SOA 414, specifically, absorbing light without injecting current to the SOAs 414 connected to output ports other than the output port (to output light) to be switched, and amplifying light by injecting current to the SOA 414 connected to the output port to be switched.

In the optical switch element 41, switching of the port that outputs light is achieved by the optical waveguide structure, and thus a difference in characteristic occurs for each port or chip due to a production error of the optical waveguide, for example. In particular, regarding loss, the optical waveguide element generally has an extreme difficulty in removing a difference in loss between output ports even when the waveguide length is designed to be equal, and a deviation in output strength of light output from the output optical waveguide 415 of the optical switch element 41 occurs. In view of this, in this embodiment, an amplification rate is set for each SOA 414 in consideration of the loss amount of each output port, and the amount of current to be injected to the SOA 414 connected to the output port to be switched is adjusted based on the amplification rate. With this, it is possible to suppress the deviation in output strength in switching.

Specifically, in this embodiment, for example, a loss amount on a path to each output port is grasped by measurement as a loss amount acquired in advance, and a current to be injected at the time of amplifying light is adjusted for each SOA 414 based on the loss amount for each path, to thereby perform control so that the output strength of light is set to a fixed level.

That is, the loss amounts are measured in advance for all the output ports, and the amount of current to be injected at the time of transmitting light is set for each SOA 414.

With the configuration illustrated in FIG. 6, it is possible to equalize the output strength of light output from the optical switch 40 in addition to light output from the optical switch element 41 by considering, as loss amounts acquired in advance, not only a waveguide loss in the optical switch element 41 but also a deviation in loss between connectors such as the passive optical couplers 42 and the optical fibers 43 connecting those couplers.

Third Embodiment

Figure 7:
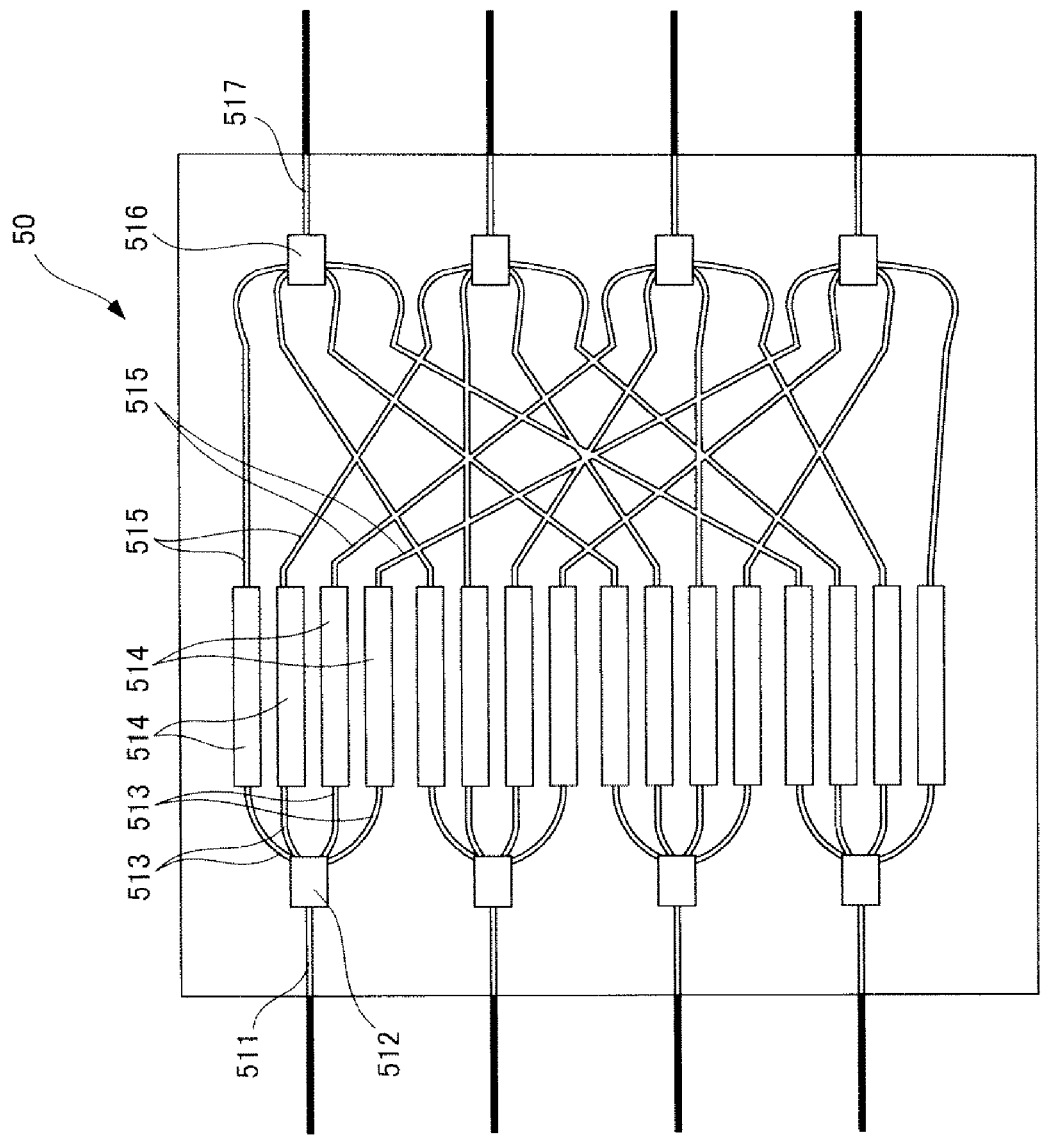
FIG. 7 is a configuration diagram illustrating a 4×4 broadcast-and-select optical switch according to a third embodiment of the present invention.

Now, a description is given of an optical switch element according to a third embodiment of the present invention with reference to FIG. 7.

As illustrated in FIG. 7, an optical switch (optical switch element) 50 according to this embodiment is a monolithically integrated 4×4 broadcast-and-select optical switch in which the 4×4 broadcast-and-select optical switch illustrated in FIG. 6 is monolithically integrated on a semiconductor chip. As described next in detail, the optical switch (optical switch element) 50 according to this embodiment includes four input optical waveguides 511, four 1×4 optical couplers 512, a total of sixteen branch optical waveguides 513, SOAs 514 serving as sixteen light absorption gates, sixteen optical waveguides 515, four 4×1 passive optical couplers 516, and four output optical waveguides 517. The four 1×4 optical couplers 512 are connected to the four input optical waveguides 511, respectively. The total of sixteen branch optical waveguides 513 are connected to the respective 1×4 optical couplers 512 on the output side in units of four waveguides. The total of sixteen SOAs 514 are connected to the sixteen branch optical waveguides 513 as light absorption gates, respectively. The sixteen optical waveguides 515 are connected to the sixteen SOAs 514, respectively. The four 4×1 passive optical couplers 516 are each connected to the four optical waveguides 515. The four output optical waveguides 517 are connected to the four 4×1 passive optical couplers 516, respectively. In other words, the optical switch 50 illustrated in FIG. 7 has an optical circuit constructed by the optical waveguides 515 corresponding to the output optical waveguides 315 illustrated in FIG. 6.

In this optical switch 50, each of four input fractions of light is divided into four fractions of light by the 1×4 optical coupler 512, and the sixteen fractions of light are input to the sixteen SOAs 514. The fractions of light output from the SOAs 514, which are four fractions of light obtained by dividing one light by each 1×4 optical coupler 512, are input to different passive optical couplers 516 via the optical waveguides 515, respectively. The four passive optical couplers 516 each combine the four fractions of light into one light, resulting in four outputs.

In the optical switch 50 according to this embodiment, similarly to the second embodiment, a difference in characteristic occurs for each port or chip due to a production error of the optical waveguide, for example. In addition, in wiring of the optical waveguides 515 between the SOAs 514 and the passive optical couplers 516, waveguides in a part of the optical waveguides 515 intersect with each other, which causes a loss and results in a larger difference in loss between output ports. In view of this, in this embodiment, an amplification rate is set for each SOA 514 in consideration of the loss amount of each output port, which depends on the loss amount different for each optical waveguide 515, and the amount of current to be injected to the SOA 514 connected to the output port to be switched is adjusted based on the amplification rate. With this, it is possible to suppress the deviation in output strength in switching.

Specifically, in this embodiment, for example, a loss amount on a path to each output port is grasped by measurement as a loss amount acquired in advance, and a current to be injected at the time of amplifying light is adjusted for each SOA 514 based on the loss amount for each path, to thereby perform control so that the output strength of light is set to a fixed level.

That is, the loss amounts are measured in advance for all the output ports, and the amount of current to be injected at the time of transmitting light is set for each SOA 514.

In this embodiment, the SOA 514 is used as an example of the light absorption gate. However, similarly to the first embodiment, a similar effect can be expected even when an EAM is used as the light absorption gate.

Fourth Embodiment

Figure 8:
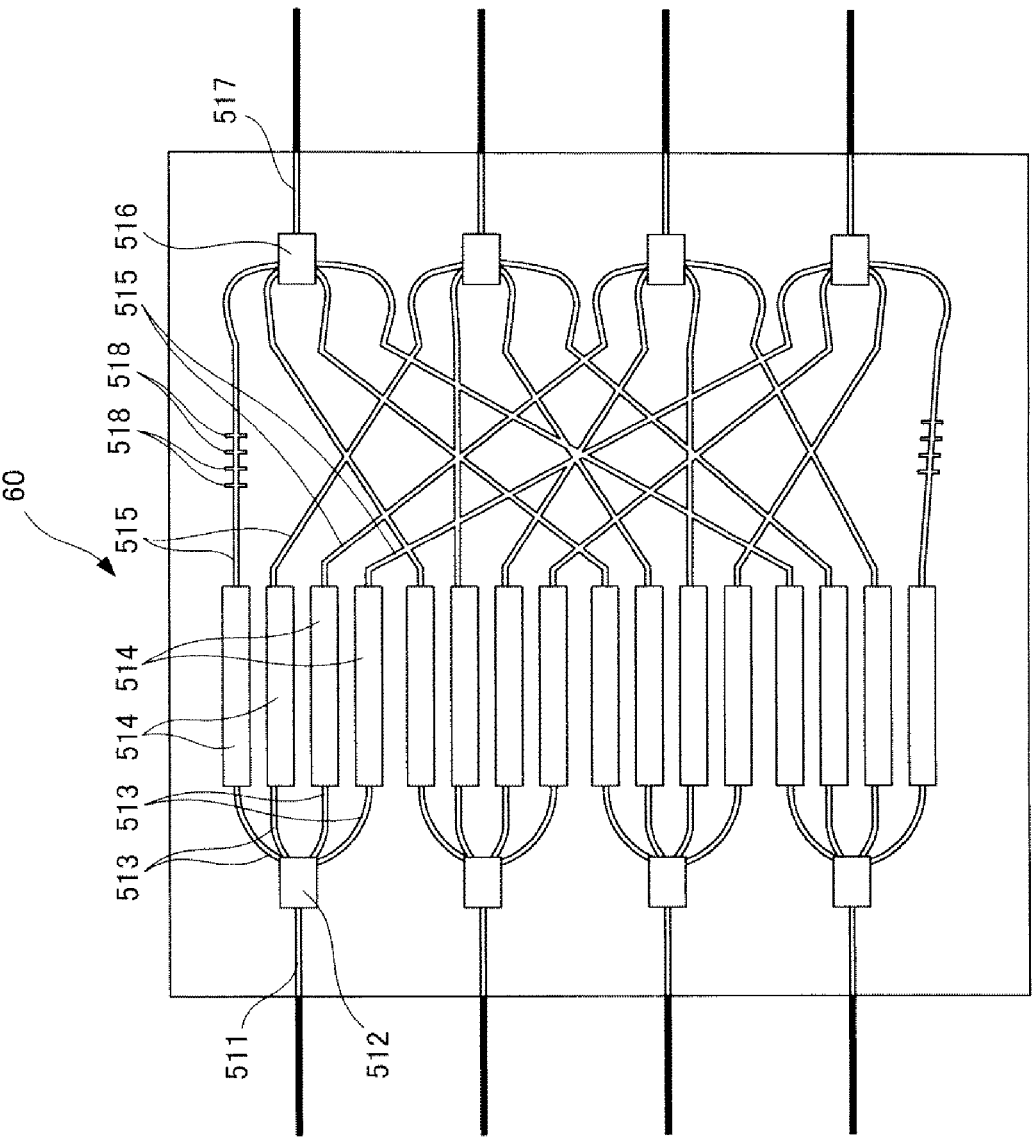
FIG. 8 is a configuration diagram illustrating a 4×4 broadcast-and-select optical switch according to a fourth embodiment of the present invention.
Figure 9:
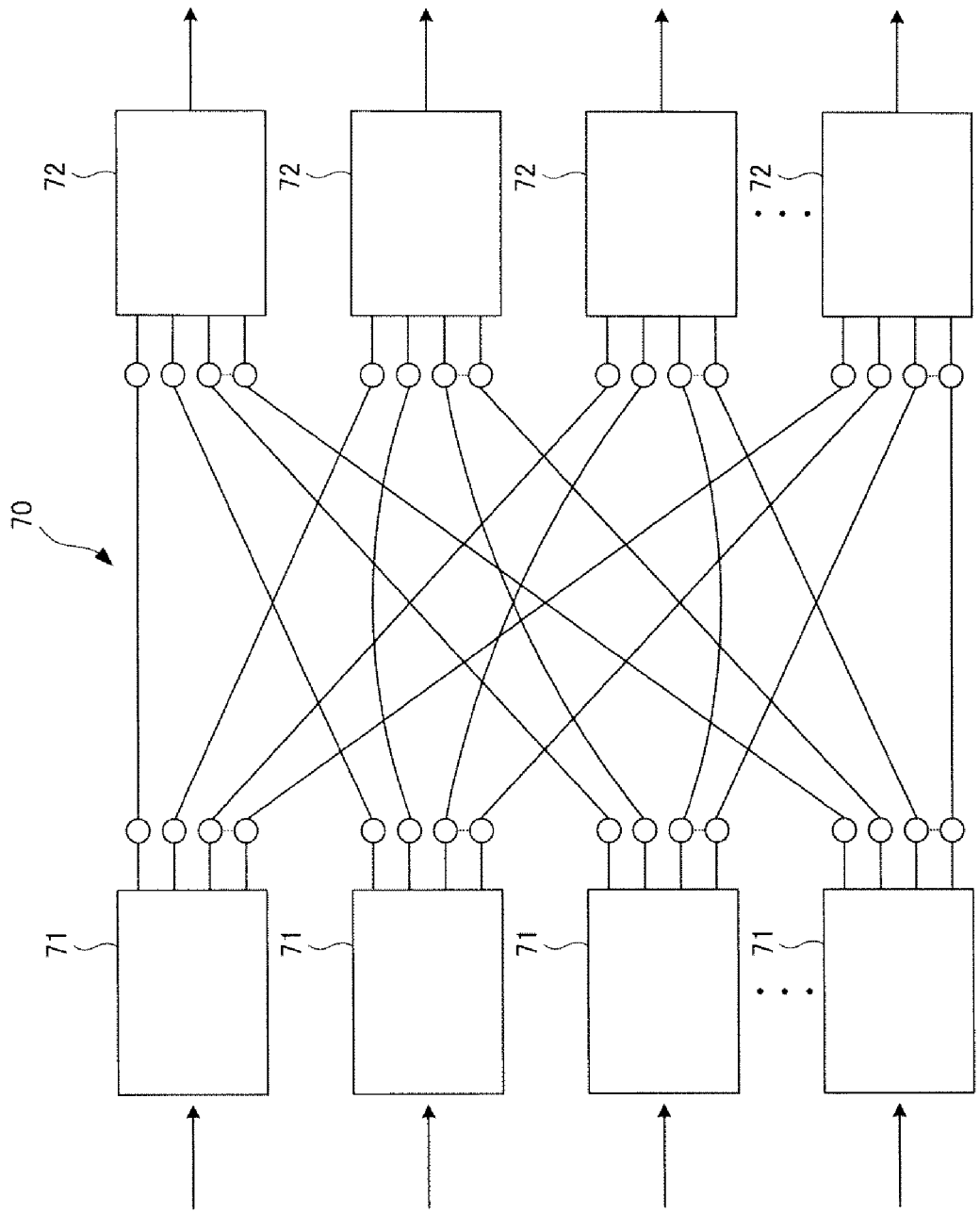
FIG. 9 is a configuration diagram illustrating an example of a related-art N×N optical switch.
Figure 10:
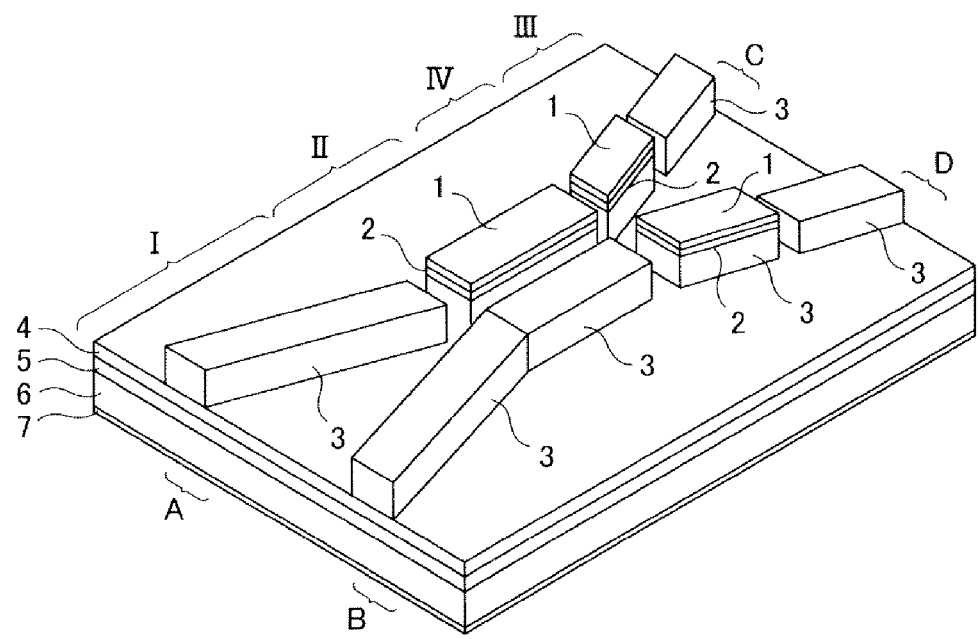
FIG. 10 is an oblique view of an example of a related-art 2×2 optical switch element.

Now, a description is given of an optical switch element according to a fourth embodiment of the present invention with reference to FIG. 8.

As illustrated in FIG. 8, an optical switch (optical switch element) 60 according to this embodiment is a monolithically integrated 4×4 broadcast-and-select optical switch illustrated in FIG. 7 to which a pseudo intersection 518 being a loss medium is added. Other configurations are similar to those of the monolithically integrated 4×4 broadcast-and-select optical switch described in the third embodiment, and in the following, parts exhibiting similar actions are assigned with the same reference numerals, and a redundant description thereof is omitted.

In this embodiment, the pseudo intersection 518 is formed to intersect with two optical waveguides (optical waveguides connected to the respective two SOAs 514 arranged at both ends among the sixteen SOAs 514) 515 that do not intersect with other optical waveguides 515.

In this optical switch 60, each of four input fractions of light is divided into four fractions of light by the 1×4 optical coupler 512, and the sixteen fractions of light are input to the sixteen SOAs 514. The fractions of light output from the SOAs 514, which are four fractions of light obtained by dividing one light by each 1×4 optical coupler 512, are input to the different passive optical couplers 516 via the optical waveguides 515, respectively. The four passive optical couplers 516 each combine the four fractions of light into one light, resulting in four outputs.

Also in the optical switch 60 according to this embodiment, similarly to the third embodiment, a difference in loss between output ports occurs due to a waveguide intersection. In view of this, optical waveguide structure that intersects with the optical waveguides 515 (optical waveguides connected to the respective two SOAs 514 arranged at both ends among the sixteen SOAs 514 in this embodiment) having a small number of intersections is formed and set as the pseudo intersection 518, to thereby cause a loss amount similar to that of the waveguide intersection.

With the optical switch 60 according to this embodiment configured in this manner, it is possible to achieve, among the optical waveguides 515, a loss amount similar to that of an output port to which the optical waveguide 515 intersecting with other optical waveguides 515 is connected also for an output port to which the optical waveguide 515 having a small number of intersections with other optical waveguides 515. Therefore, in addition to the effect in the third embodiment described above, it is also possible to obtain an effect of reducing a difference in loss between output ports and suppress a difference in transmittance adjustment amount between the SOAs 514.

Further, in addition to the pseudo intersection 518 based on the above-mentioned optical waveguide structure, as loss medium structure, a similar effect can be expected as long as a moderate loss can be caused in a desired optical waveguide 515 like structure in which a grating, a slit, or the like is formed on the side surface or top surface of the optical waveguide.

Further, in this embodiment, an example of providing the pseudo intersection 618 for two optical waveguides (specifically, two optical waveguides having smaller loss amounts among the sixteen optical waveguides 515) 515 that do not intersect with other optical waveguides 515 has been described. However, the number of optical waveguides 515 to which a loss medium is provided is not limited to two, and a loss medium can be provided as necessary for a part (equal to or larger than 1 and smaller than N) of optical waveguides 515 having smaller loss amounts among the sixteen optical waveguides 515.

Further, in the example illustrated in FIG. 8, an example of setting the four pseudo intersections 518 in one output optical waveguide 515 has been described. However, the number of pseudo intersections 518 to be set in one output optical waveguide 515 can be changed as necessary.

Further, also in this embodiment, similarly to the second and third embodiments, an example of using the SOA 514 as the light absorption gate has been described. However, a similar effect can be expected also when an EAM is used similarly to the first embodiment.

REFERENCE SIGNS LIST 11 1×2 Optical switch
11A Input port
11B Output port
30, 40, 50, 60 Optical switch
31, 41 Optical switch device
32, 42, 516 Passive optical coupler
33 EDFA
34, 35, 43 Optical fiber
111, 311, 411, 511 Input optical waveguide
112 1×2 Optical coupler 113, 313, 413, 513 Branch optical waveguide
114, 314 EAM
115, 215, 315, 415, 517 Output optical waveguide
212 MZI optical switch
212a 1×2 Optical coupler
212b Optical waveguide
212c 2×2 Optical coupler
212d Control electrode
312, 412, 512 1×4 Optical coupler
414, 514 SOA
515 Optical waveguide
518 Pseudo intersection

The invention claimed is:

1. An optical switch element, comprising:
an optical coupler configured to divide an input light into N fractions of light and output the N fractions of light, where N represents an integer equal to or larger than 2;
N branch optical waveguides connected to an output side of the optical coupler;
N light absorption gates connected to the respective N branch optical waveguides; and
N output optical waveguides connected to the respective N light absorption gates,
wherein the optical coupler, the N branch optical waveguides, the N light absorption gates, and the N output optical waveguides being connected to one another in order, the N light absorption gates each being controlled to adjust an output strength of transmitted light output from the N output optical waveguides based on a loss amount acquired in advance by a light absorption effect or light amplification effect of the N light absorption gates,
wherein the N output optical waveguides form a light circuit and have different loss amounts, and wherein the N light absorption gates are each controlled to adjust the output strength of transmitted light output from the N output optical waveguides based on the loss amounts different for the respective N output optical waveguides by the light absorption effect or light amplification effect of the N light absorption gates,
wherein the optical switch element further comprises a loss medium configured to increase loss amounts of a part of the N output optical waveguides, which are smaller than loss amounts of the N output optical waveguides, among the N output optical waveguides, and
wherein the loss medium includes a pseudo intersection that artificially causes a loss due to a waveguide intersection.

2. The optical switch element according to claim 1, further comprising, in place of the optical coupler, a structure of dividing the input light into N fractions of light and outputting the N fractions of light by using an interference effect due to an MZI, where N represents an integer equal to or larger than 2.

3. The optical switch element according to claim 2, wherein the light absorption gates include an electroabsorption modulator.

4. The optical switch element according to claim 2, wherein the light absorption gates include a semiconductor optical amplifier.

5. The optical switch element according to claim 1, wherein the light absorption gates include an electroabsorption modulator.

6. The optical switch element according to claim 1, wherein the light absorption gates include a semiconductor optical amplifier.

* * * * *